H. G. WEIDENTHAL.

ELECTRIC FURNACE.

APPLICATION FILED MAR. 25, 1920.

Reissued June 6, 1922. 15,378.

WITNESSES:

H. J. Shelhamer

N. M. Biebel

INVENTOR

Harold G. Weidenthal

BY

Wesley G. Carr

ATTORNEY

UNITED STATES PATENT OFFICE.

HAROLD G. WEIDENTHAL, OF CLEVELAND, OHIO, ASSIGNOR, BY MESNE ASSIGNMENTS, TO WESTINGHOUSE ELECTRIC & MANUFACTURING COMPANY, A CORPORATION OF PENNSYLVANIA.

ELECTRIC FURNACE.

15,378. Specification of Reissued Letters Patent. Reissued June 6, 1922.

Original No. 1,304,425, dated May 20, 1919, Serial No. 262,780, filed November 16, 1918. Application for reissue filed March 25, 1920. Serial No. 368,685.

*To all whom it may concern:*

Be it known that I, HAROLD G. WEIDENTHAL, a citizen of the United States, residing at Cleveland, in the county of Cuyahoga and State of Ohio, have invented a certain new and useful Improvement in Electric Furnaces, of which the following is a full, clear, and exact description, reference being had to the accompanying drawings.

This invention relates to electric furnaces and resistance elements therefor, and has for its object the provision of a new, improved, and simplified type of furnace; the provision of an electric furnace particularly adapted for manufacture in small sizes as required by brass and bronze founders, aluminum founders, and the like, although of great value in larger sized installations; the provision of a furnace wherein the largest possible amount of the heat generated shall be usefully employed; the provision of a furnace so constructed as to permit the easy replacement of resistance elements if and when required; the provision of a furnace equally applicable to direct or alternating current systems; the provision of a cheap, efficient and long-lived resistance element which shall be capable of withstanding high temperatures and oxidizing atmospheres; while further objects and advantages of my said invention will become apparent as this description proceeds.

Figure 1:
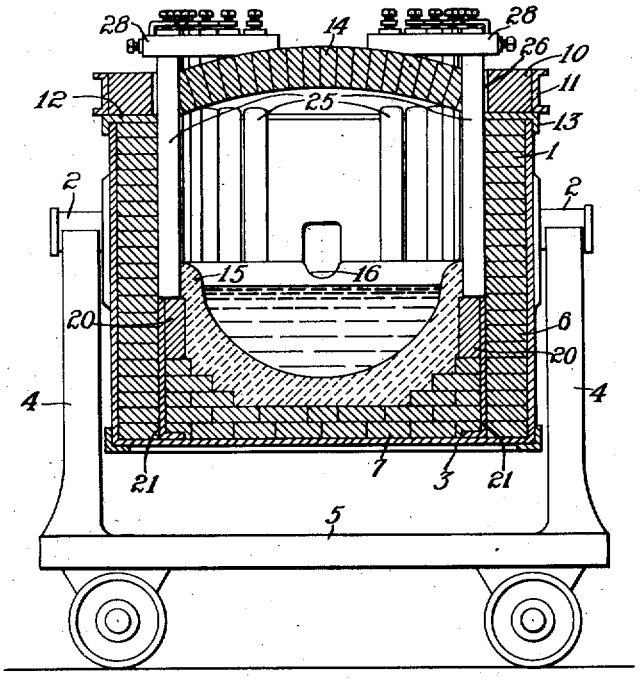
Figure 4:
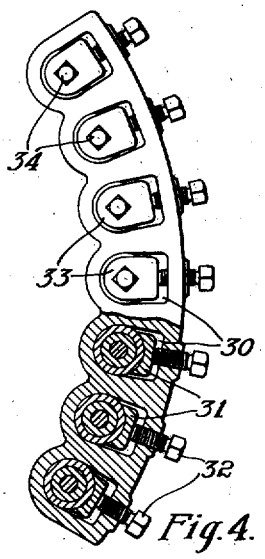
Figure 3:
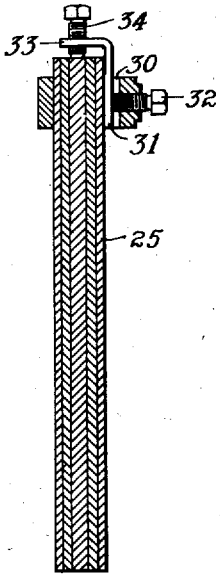
Figure 2:
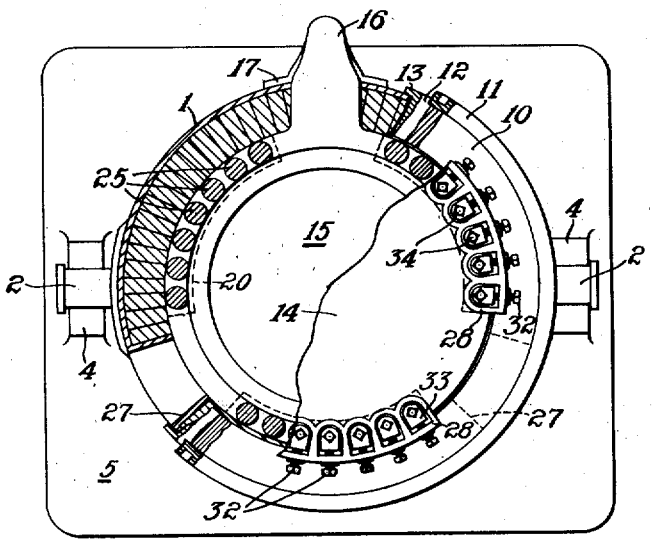

In the drawings accompanying and forming a part of this application I have shown one embodiment of my said invention, although it will be understood that these drawings are illustrative merely and are not intended to be exhaustive of all the various constructions and arrangements which may be employed within the scope of my inventive idea. In these drawings Figure 1 is a vertical sectional view of a simple type of furnace constructed in accordance with my invention, together with a simple mounting therefor; Fig. 2 is a top plan view of said furnace a part of one side being broken away to show the internal construction; Fig. 3 is a view partly in elevation and partly in longitudinal section, of my improved resistance element, together with a preferred type of electric connection; and Fig. 4 is a top plan view of the preferred connecting device.

Describing the parts by reference characters, 1 represents the shell of my improved furnace which is preferably cylindrical in shape and made of steel or other rigid conducting material of a considerable resistance to fusion. The same is provided with trunnions 2—2 whereby it may either be held in an approximately upright position for use, rocked for the purpose of agitating the melt, or inclined for purposes of pouring. The bottom of this shell is closed by a plate 3. The trunnions are here shown as journaled at the top of uprights 4—4 carried by a movable car or truck 5, although the method of mounting the furnace may be varied widely without departing from the scope of my invention. The shell 1 is lined with the refractory material 6, and the bottom covered by refractory material 7, preferably in the form of bricks as shown. Mounted upon the side walls is a ring 10 of refractory material either molded or in block form as desired, surrounded by a metal supporting band 11 and underlaid by a metal plate 12, the latter preferably having a downturned flange 13 loosely surrounding the shell 1 whereby it is held in position. The roof of the furnace consists of refractory bricks 14 built inside the ring 10 and suitably arched to carry the weight. This construction enables the top part of the furnace to be lifted off as a whole in order to gain access to the furnace interior.

In the lower part of the cavity thus defined there is located a molded bath 15 of silica, magnesite, carborundum sand, or other suitable refractory, the edge of said bath being extended outwardly through the shell 1 at one point as shown at 16 to form a pouring lip whose extremity is supported by a metal nose 17 carried by the shell. Surrounding the bath 15, inside of the refractory walls 6—6 are located one or more arcuate conducting elements 20—20, here shown as electrically connected to the botom plate 3 by means of metal plates 21—21. It will be understood, however, that electrical connection can be made in other ways but I prefer this construction as being the simplest.

The resistance elements are shown at 25—25 and are made in the form of elongated rods set in vertical position around the interior of the furnace walls with their lower ends resting on the conductors 20—20 and their upper ends projecting loosely through suitable apertures 26 formed in the roof 14. The banks of the bath 15 preferably rise a short distance above the upper edge of the conductors 20—20 and embrace the elements 25 rather closely, being made of sufficient thickness at this point to resist chipping or accidental breakage.

The number, size, and arrangement of the resistor elements will vary according to the use to which the furnace is to be put, the nature of the current employed, and the heat to be generated, but a space will ordinarily be left at the pouring lip and also at one or more other places to permit the location of operating and inspection openings 27. In the present embodiment I have shown the resistors as arranged in three equidistantly-spaced gangs, and have shown the conductors 20 as consisting of three spaced segments, the same being so located as to give space for the pouring lip 16 and also for the doors 27 of which two are indicated. This is the preferred construction for use with three phase current, the upper ends of the several gangs of resistors being connected to suitable conductors 28 to which are attached the current leads (not shown). Either Δ connection or Y connection can be employed, the neutral lead where used being suitably connected to the conductors 20 in the present case through the shell of the furnace.

In case double phase current be employed the resistors can be arranged in two equal banks, and in case monophase alternating current or direct current be employed the same can be connected together in parallel as will be apparent to those skilled in the art, the conductors 20 being similarly rearranged as may be necessary to make proper connection therewith. The conductors 20 can be made in continuous circular form if desired, but I prefer to make them of a discontinuous nature and to connect them electrically by metallic conductors, whether or not those conductors be grounded upon the shell as herein shown, since cracking and breaking of the same owing to unequal expansion is thereby reduced and its occurrence rendered less obnoxious.

Any suitable or desired material can be employed for these resistors, but the material which I prefer consists essentially of carborundum or the so-called "carborundum sand" which is the granular or amorphous material produced in large quantities in the manufacture of crystalline carborundum and consisting of certain partially combined composition of carbon and silicon. It is formed to the desired shape by being mixed with a suitable binder such as molasses, tar, water glass, or glue and baked until the volatile constituents of the binder are driven off. I preferably coat the exterior of each element with finely divided crystalline carborundum (which is easily accomplished by rolling the element therein or sprinkling the same therewith prior to baking), since the resistance of this material to atmospheric action at high temperature is greater than that of the carborundum sand.

Carborundum, either in the crystalline form or the amorphous and partially combined form, possesses a very small electrical conductivity when cold, which, however, increases rapidly with rise of temperature until a red heat is reached, after which its change becomes much smaller and more nearly uniform. Accordingly, for the purpose of initiating the operation I preferably provide at least one resistance element of each gang with a core of material which will conduct electricity with the proper facility at ordinary temperatures, trusting to the shielding effect of the carborundum to prevent the disintegration of the same at the higher temperatures under which the furnace is operated. This core may be either of carbon or of some suitable metal or alloy. I prefer to make the same of finely divided carbon tamped inside a longitudinal bore with which the element is formed, since the initial resistance of such granular carbon is sufficiently high to enable the employment of a core of considerable size and rapid heating effect, while the carborundum shell will prevent any serious oxidation at high temperatures. However such materials as the high resistance alloys of iron and chromium, well known in the trade under the name of "nichrome" can be employed, or many other alloys, or even iron wire in some instances, although such metallic conductors are necessarily of much smaller size and hence of slower heating effect as well as being more subject to breakage in use. It is desirable that the resistance of the core be at least as high when cold as that of the carborundum part of the core when hot, since otherwise it would require more current to start the furnace than to operate it; and in case a part of the elements are to be of plain construction, and only a few of the core formation, it is necessary that the combined resistance of the core resistor when heated be approximately the same as that of the plain resistors in order to secure uniform current distribution. Carbon fulfils the conditions more easily than any other substance with which I am familiar, although other materials can be employed if suitable care is used in the designing.

Each of the resistance elements can, if desired, be made of this internally cored construction and such an arrangement is frequently desirable as conducing to a more rapid starting of the furnace; but it is sufficient for practical purposes, at least where the resistance elements are located closely together, to make only one element of each gang with a core, since the heating effect of each cored resistor will soon bring its neighbors into operation.

It will be understood that in some cases the conductors can be made as a part of the bath itself or the material to be heated can be so utilized; I have here shown the members 20, 20 as being of carbon, trusting to the shielding effect of the banks to protect them against oxidation, but it will be understood that in some cases the entire bath or bosch can be made of carbon or of some metal, and thus be itself conducting at all temperatures; or if made of a pyro-conducting material such as magnesite or carborundum it will become an additional conductor at high temperatures.

In case any element should be broken or destroyed the same can easily be removed and a new one substituted therefor without disturbing any other part of the furnace, and to facilitate this replacement the conductors 28 are preferably so arranged that the resistors are secured independently of each other; for example the same may be made in the form of an arcuate casting having therein a plurality of recesses 30 parallel to the axis thereof and provided at one side with gibs 31 adapted to be clamped upon the resistors by means of set screws 32; and for the purpose of conveying current to the conducting core of such elements as have cores, over-hanging metallic arms 33 are provided (preferably upon the gibs since the same are easily removable, although not necessarily so located) and these arms are provided with contact members 34 adapted to engage the conducting core, said contacts being either fixed or movable as may be desired, although I have shown the same as consisting of a vertical set screw the better to provide for variations in the length of the element or in the closeness of contact. It will be clear that independent clamps can equally well be employed and the conductor made of other substance than metal.

It will be apparent that the resistors need not be exactly upright but may be considerably inclined if desired; that their number and arrangement may be varied greatly; that the method and fittings for connecting them together and to the current source can be varied widely within my invention; that the detail construction of and the method of mounting the furnace can be modified largely, and other changes made within the scope of my invention.

Having thus described my invention, what I claim is:—

1. In an electric furnace, a refractory casing having upright walls, a refractory bath in the lower part of said casing, an arcuate conductor located between said bath and the casing wall, said conductor being located entirely beneath the bank of said bath, a plurality of resistance elements arranged in approximately upright position around the interior of said casing having their lower ends resting on said conductor, and electrical connections to the upper ends of said resistance elements.

2. In an electric furnace, a refractory bath having a basin shape, refractory walls rising above the banks of said bath, a roof connecting said walls at a distance above said bath, a refractory conductor located between said bath and the casing wall, a plurality of resistance elements arranged around said refractory walls between said bath and roof and having their lower ends resting on said conductor, and electrical connections to the upper ends of said resistance elements.

3. In an electric furnace, a refractory casing having substantially upright walls, a refractory bath in the lower part of said casing, a roof covering the upper end of said casing, a conductor located between the exterior of said bath and the interior of the casing wall, said roof having an aperture above said conductor and close to the casing wall, and a resistance element having its lower end resting on the said conductor and its upper end projecting through said aperture.

4. In an electric furnace a refractory casing having a substantially upright cylindrical wall, a refractory bath in the lower part of said casing, a roof covering the upper end of said casing, a segmental refractory conductor located between the exterior of said bath and the interior of the casing wall, the segments of said conductor being symmetrically spaced about said bath and said roof having a row of apertures located above each segment of said conductor and close to the casing wall, a plurality of elongated resistance elements having their lower ends resting on the said conductor and their upper ends projecting through said apertures, and means outside of said furnace for connecting together the upper ends of each gang of elements.

5. In an electric furnace, a refractory casing having substantially upright walls and a roof connecting the same, said roof having a series of spaced apertures therein adjacent to the casing wall, a refractory bath in the lower part of said casing, a plurality of sectional conductors located between the exterior of said bath and the interior of the casing wall, means connecting said conductors electrically together, elongated resistance elements resting on said conductors and projecting through said apertures, and means above said roof for connecting said resistance elements electrically together and to a source of current.

6. In an electric furnace, a refractory casing, a refractory bath in said casing, a plurality of refractory conductors located inside the wall of said casing and outside of and beneath the edge of said bath, a plurality of elongated resistors resting upon said conductors and extending along said casing wall above the edge of said bath, and means for connecting the upper ends of said resistors to a source of electric current.

7. In an electric furnace, a bath, conducting elements embracing said bath, and a plurality of independently removable resistance elements arranged in upright position around said bath with their lower ends resting upon said conducting elements.

8. In an electric furnace, a bath, conducting elements embracing said bath, a plurality of independently removable resistance elements arranged in upright position around said bath with their lower ends resting upon said conducting elements, and other conducting elements engaging and connecting together the upper ends of said resistance elements.

9. In an electric furnace, a refractory bath, conducting elements arranged outside of said bath and beneath the upper edge thereof, and a plurality of upright elongated resistance elements arranged around said bath and making contact with said conductors.

10. In an electric furnace, a refractory bath, conducting elements arranged outside of said bath and beneath the upper edge thereof, a plurality of gangs of upright elongated resistance elements arranged around said bath and making contact with said conductors, and other conductors engaging and connecting together the upper ends of the elements of each gang.

11. In an electric furnace, in combination, a pair of contact members, a plurality of resistors extending in parallel from one member to the other, certain of said resistors being composed entirely of a material which is electrically conducting at elevated temperatures and electrically resisting at ordinary temperatures, and others of the same consisting of a shell of such refractory material which is electrically conducting at a high temperature while being substantially non-conducting at ordinary temperatures and having cores of material which is conducting at ordinary temperatures, the combined resistance of the core and shell of said last named resistors being substantially the same at the working temperature as that of the plain resistor.

12. In an electric furnace, a plurality of gangs of resistor elements arranged around the working cavity thereof, the resistors of each gang being electrically connected in parallel, part of the resistors of each gang being made of a refractory material which is electrically conducting at high temperatures while being substantially nonconducting at ordinary temperatures, and other resistors of each gang consisting of a shell of refractory material which is electrically conducting at high temperature while being substantially non-conducting at ordinary temperatures, and also having a core of material which is conducting at ordinary temperatures, the resistance of each of the last mentioned resistors at the working temperatures being substantially the same as that of the resistance of the plane of the first mentioned resistor at working temperature.

13. A resistor element for electric furnaces consisting essentially of carborundum and having a core of material which is conductive at ordinary temperatures and also infusible at the working temperatures of the furnace, the resistance of said core when cold being at least as great as that of the carborundum at the working temperature.

14. A resistor element for the purpose described consisting essentially of an elongated rod of carborundum sand held together by a binder and having an external layer of finely divided crystalline carborundum.

15. In an electric furnace, two resistor elements connected in parallel, one consisting essentially of an elongated rod of carborundum sand held together by a suitable binder and having an external layer of finely divided crystalline carborundum, and the other consisting essentially of an elongated rod having a carbon core and an external layer of finely divided crystalline carborundum, the size of said core being so chosen that the electrical resistance of said resistors is essentially equal at the working temperature.

16. In an electric furnace, a resistor consisting essentially of a refractory substance which is substantially a non-conductor at ordinary temperatures and a resistant conductor at high temperatures, said resistor having a core of resistance material which is electrically conducting at ordinary temperatures, and terminal contacts for said resistor adapted to engage both said refractory and said core.

17. In an electric furnace, a resistor consisting essentially of a refractory substance which is substantially a non-conductor at ordinary temperatures and a resistant conductor at high temperatures, said resistor having a core of resistance material which is electrically conducting at ordinary temperatures, a terminal pressed against the refractory part of said resistor and making electric contact therewith, and a part carried by said terminal and electrically connected thereto but movable independently thereof for making contact with said core.

18. In an electric furnace, the combination with a bath and conducting elements embracing said bath, of a plurality of elongated resistors arranged in gangs about said bath with their lower ends contacting with said conducting elements, other conducting elements applied to and subtending the upper ends of said gangs, and independently movable parts associated with said last elements adapted to engage the several resistors.

19. In an electric furnace, the combination with a refractory casing, of a conductor of arcuate form in said casing, a refractory resistor operatively engaging said conductor, and electrical connections for said resistor.

20. In an electric furnace, the combination with a refractory casing, a refractory bath in said casing and a roof for said casing above said bath, of a refractory conductor of arcuate form located in said casing and embracing said bath, a plurality of resistance elements disposed around said bath and having corresponding ends in operative engagement with said conductor and electrical connecting members associated with the other ends of said resistance elements.

21. In an electric furnace, the combination with a refractory casing having substantially upright walls, a refractory roof for said casing and a refractory bath in said casing, of conducting means located in said casing and adjacent said bath, said roof having an aperture above said conductor, and a resistance element having one end in operative engagement with said conducting means and its other end projecting through said aperture.

22. In an electric furnace, the combination with a refractory casing having substantially upright walls and a roof connecting the same, said roof having a series of spaced apertures therein adjacent to the casing wall, and a refractory bath in said casing, of a plurality of sectional conductors located adjacent to said bath in said casing, electrical connecting means for said conductors, resistors operatively engaging said conductors and projecting through said apertures, and electrical connecting means for said resistors located above said roof.

23. In an electric furnace, the combination with a solid refractory resistor comprising an outer part and a core part, the electrical-resistance characteristics of the two parts being different, of a terminal member for said resistor comprising a part operatively engaging the outer part of said resistor and a second part operatively engaging the core part of said resistor.

In testimony whereof, I have hereunto subscribed my name this 1st day of March, 1920.

HAROLD G. WEIDENTHAL.